(No Model.)
2 Sheets—Sheet 1.

T. C. LONG.
SLIDING AND SWINGING GATE.

No. 513,191.  Patented Jan. 23, 1894.

Witnesses
Inventor
Thomas Catesby Long
By Johnson and Johnson
his Attorneys (No Model.) 2 Sheets—Sheet 2.
T. C. LONG.
SLIDING AND SWINGING GATE.
No. 513,191. Patented Jan. 23, 1894.
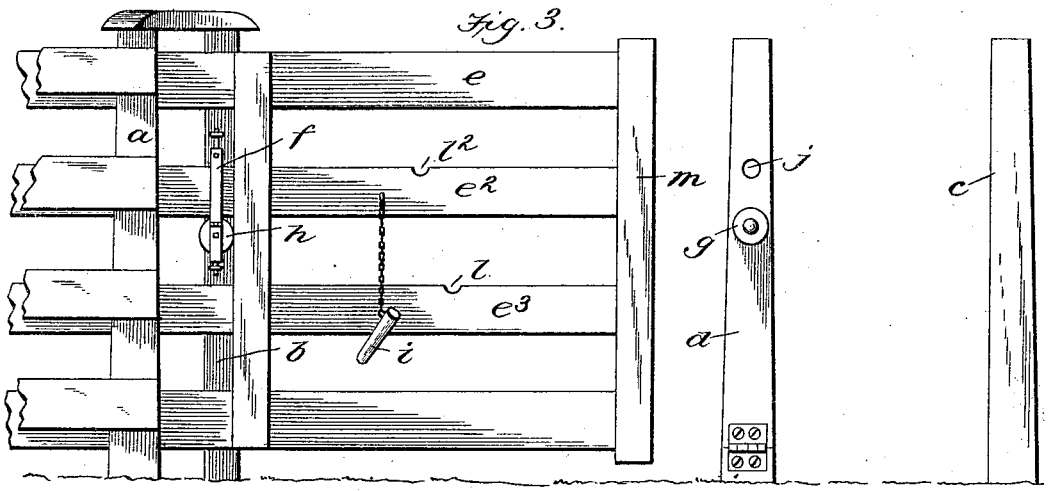
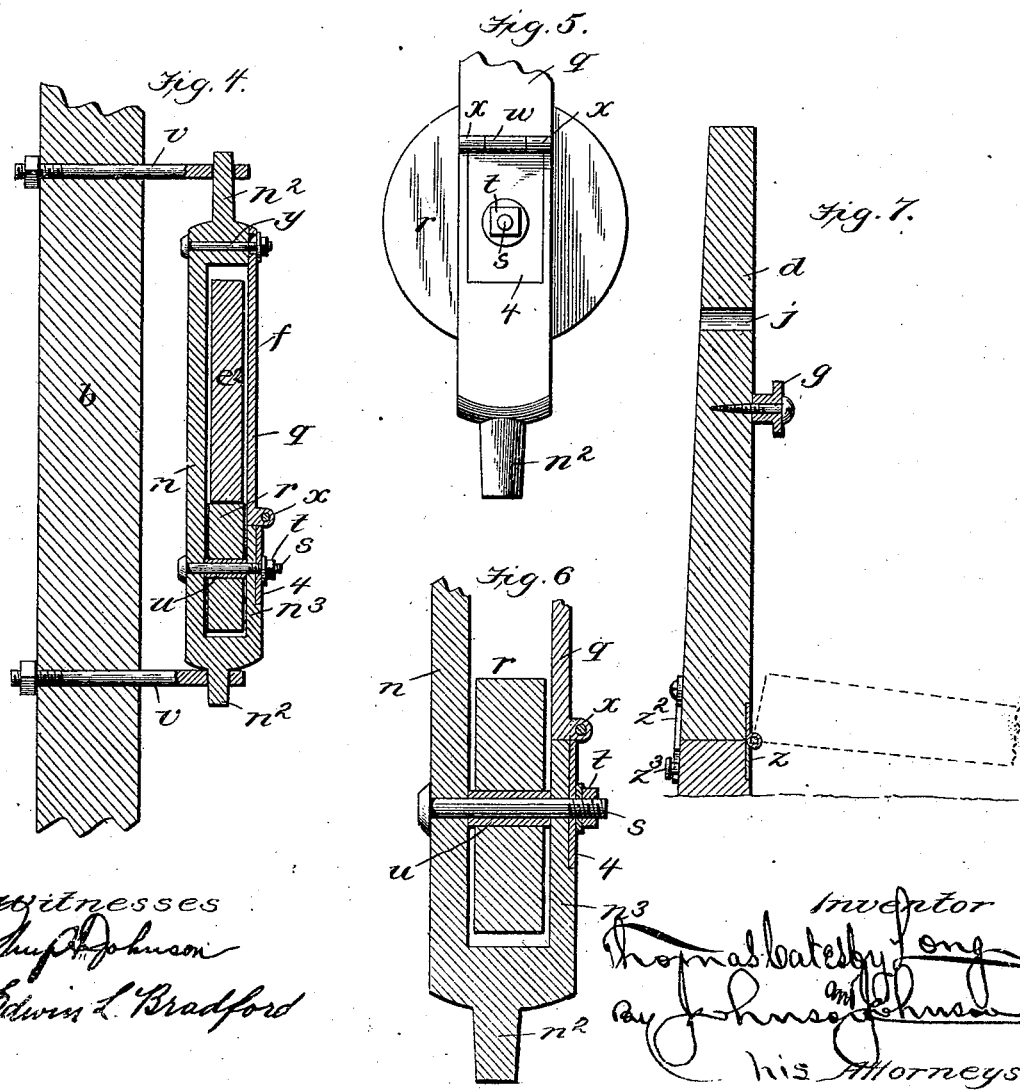

UNITED STATES PATENT OFFICE.

THOMAS CATESBY LONG, OF WEST CHESTER, PENNSYLVANIA.

SLIDING AND SWINGING GATE.

SPECIFICATION forming part of Letters Patent No. 513,191, dated January 23, 1894.

Application filed October 31, 1893. Serial No. 489,632. (No model.)

*To all whom it may concern:*

Be it known that I, THOMAS CATESBY LONG, a citizen of the United States, and a resident of West Chester, in the county of Chester and State of Pennsylvania, have invented certain new and useful Improvements in Sliding and Swinging Gates, of which the following is a specification.

My invention relates to farm gates adapted to be opened and to be closed by a sliding and swinging movement, in which the gate is slid half way open and then swung at right angles to complete the opening; and my improvements consist in provision whereby the gate is adapted to be partly opened for a footway passage, or to be fully opened for the passage of teams; in provision whereby the gate can be raised and held up at one end when closed to allow hogs to pass out under it while preventing the passage of larger stock; in the provision of an improved hanger on which the gate swings and from which it can be quickly removed for repairs or other purposes; and in the provision of a pin and flanged roll as a fastening for the gate when closed, and when raised for the passage of hogs or sheep. In these particulars the accompanying drawings illustrate my improvements, which I will specifically set out in the claims concluding this specification, and in which—

Figure 1:
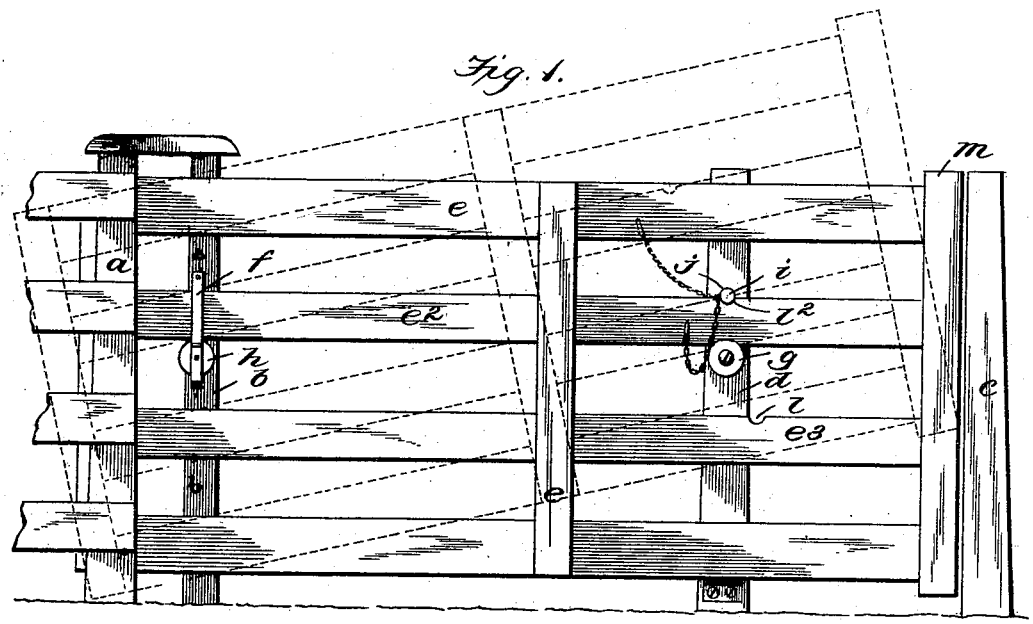
Figure 2:
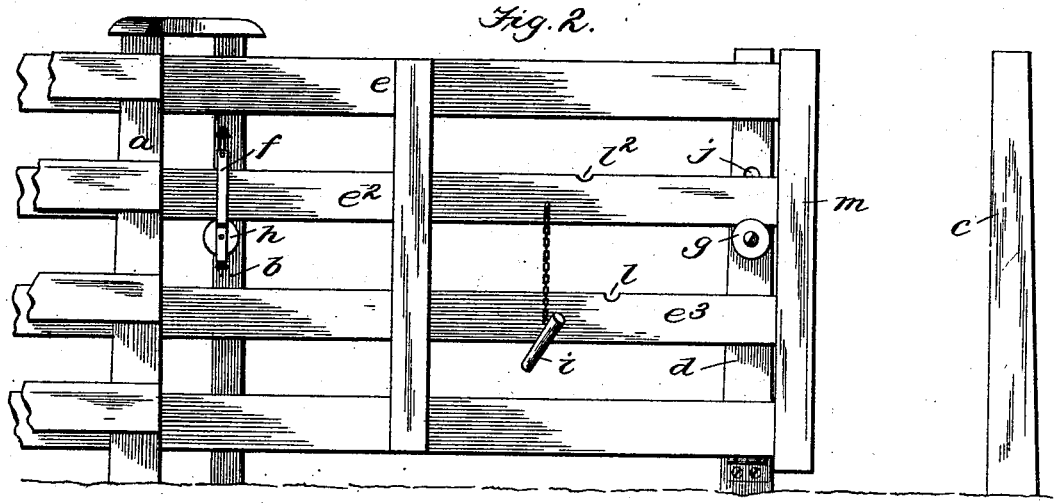

Figure 1 shows the gate closed and fastened, and in dotted lines the gate is shown raised at the end to form a bottom stock-way. Fig. 2 shows the gate open to form a footway. Fig. 3 shows the gate as balanced on the hanger in position to be swung open thereon to form the teamway. Fig. 4 shows the gate-hanger as it is secured to the gate post. Fig. 5 shows the hinged side of the gate-hanger. Fig. 6 is a detail view of the hanger roll bearing and the hinge of the hanger-strap; and Fig. 7 shows the hinged post upon which the gate is supported to form the footway.

The gate slides and swings between a gate-post $a$ and a cap connected gate post $b$ and closes with the other gate post $c$; while an intermediate post $d$ serves to support the gate in forming the footway and the bottom stock-passage.

$e$ is the sliding and swinging gate.

$f$ is the hanger by which the gate is secured to the post $b$ and upon which it both slides and swings on one of its panel boards $e^2$ in being opened and closed. The intermediate footway post $d$ has a flanged roll $g$ upon which the gate slides; while the hanger $f$ has a roll $h$ upon which the gate both slides and swings. Upon these two rolls the gate is slid and supported to make the footway as shown in Fig. 2, and to support it in a closed position as seen in Fig. 1, wherein the gate is also shown in dotted lines as raised and supported upon the flanged roll in position to form the bottom-stockway. In this raised position the gate is supported upon the flanged roll by a lower panel-board $e^3$ and in this position the gate is held closed with the post $c$ by a pin $i$ placed in a hole $j$ in the intermediate post $d$ above the flanged roll and engages a notch $l$ in the upper edge of the panel-board $e^3$. The panel-board $e^2$ has a similar notch $l^2$ which the said pin engages to fasten the gate, when closed, as in Fig. 1. This pin fastening co-acts with the flanged roll in preventing the gate from either being slid open or raised, and locks the gate in closed position when raised. The employment of the intermediate post therefore gives the advantage of supporting the gate in position to form a footway, and in a raised position to form a bottom stockway. It will be understood that the notches in the panel-boards are so placed as to be coincident with the post hole $j$ when the gate is closed and when the gate is raised, so that the pin when placed in the post-hole locks the gate on the roll; while the flange of the roll serves as a keeper for the gate upon the roll. When the gate is raised to form the bottom stockway it will be in an inclined position with the lower end of its vertical bar $m$ resting against the post $c$, but in either position the intermediate post, its flanged roll, the pin and the hanger, co-operate to support and to fasten the gate. In opening the gate for the passage of teams the pin is removed from the post-hole and the gate rolled back to the flanged roll then raised to free its panel board from the flange to allow the gate to be slid back half its length upon its hanger on which it is then turned at right angles to fully open it.

I make the hanger preferably of a wrought iron part $n$ having a strong pivot forming stud $n^2 n^2$, at each end, and a short return arm part $n^3$ at its lower end. To this short arm part a wrought or malleable iron strap $q$ is hinged so as to close with the upper end of the hanger thereby forming a closed loop. At the lower end and within the loop a roll $r$ is mounted upon a screw bolt $s$ passed through the hanger parts and secured by a nut $t$. I prefer to seat the roll so as to turn loosely upon a sleeve $u$ which is fixed upon the bolt, and I make this fixed sleeve bearing of a length a little greater than the thickness of the roll, so that the ends of the sleeve will receive the binding action of the bolt and nut and thereby leave the roll free to turn upon the sleeve. This sleeve also prevents the wear of the bolt. The hanger is secured to the gate by lag-bolts $v$ in the eyed-ends of which the hanger pivot-studs fit.

I prefer to form the hinge for the hanger strap by eyes $w$ formed on a plate 4 countersunk on the end of the return hanger-arm, and by eyes on the ends of said strap and a pintle-pin connecting the eyed ends, the countersunk plate being secured by the bolt of the roll. The upper end of the hanger-strap is secured by a nutted bolt $y$ to the upper end of the hanger so that the gate by its panel-board can be put in the loop of the hanger upon the roll and secured by the hinged strap which closes the open side of the hanger and the gate can be quickly removed from the hanger by unfastening the hinged strap and turning it down to open the side of the loop.

As the lag-bolts are first driven into the post I provide for securing the hanger-pivot studs in them by making the upper pivot-stud the longest so that it can be put into the eye of the upper bolt first and then engage the lower pivot-stud in the eye of the lower lag bolt. This construction also allows the gate and its hanger to be removed together from the lag bolts if desired.

The provision for forming the bottom stockway is of advantage in permitting the separation of hogs and sheep from larger stock which may be on the farm together.

The driveway between the intermediate and the hanger posts is wide enough for ordinary wagons and carriages, but to permit the passage of heavy hay loads and reapers, I hinge the intermediate gate-post to a sill by a suitable hinge $z$ in a way that will allow the said post to be turned down upon the ground when it is desired to give a wider driveway. A lock $z^2$ and a pin $z^3$ serve to secure the post upright to the sill, but I may provide other fastening for this post when it is hinged, or otherwise made removable.

While I prefer to use the pin fastening for the gate in the way described, it is obvious that the fastening may be on the post $c$, in any suitable way.

I claim as my improvements—

1. In a sliding and swinging gate the combination of the intermediate post $d$ having the flanged roll $g$ and the hole $j$, the post $b$ having the pivoted hanger, the gate having its intermediate panel-boards $e^2$, $e^3$ provided with notches $l$, $l^2$, and the pin $i$, the said flanged-roll, notches and pin serving to fasten the gate when closed, against sliding, vertical and lateral displacement, substantially as described.

2. The hanger forming a closed loop for the gate panel-board and consisting of the part $n$, having end pivot studs $n^2$, $n^2$, a bottom return arm $n^3$, and a side strap $q$ hinged to the end of said arm, the bolt $y$ fastening the free end of said strap, the roll $r$, supporting the gate and lag-bolts $v$, substantially as described.

3. The combination, with a sliding and swinging gate, and the gate post, of a hanger constructed with end pivot-studs, a bottom return-arm $n^3$, and a side strap $q$ hinged to the end of said return-arm, the roll supporting the gate mounted upon a sleeve having a length greater than the thickness of the roll, the nutted bolt within said sleeve, and the lag bolts, whereby the hanger-arm is bound upon the sleeve, for the purpose stated.

In testimony whereof I have hereunto signed this specification in the presence of witnesses.

THOMAS CATESBY LONG.

Witnesses:
H. B. BUCKWALTER,
EOLINE G. GREEN.